United States Patent [19]

Jain et al.

[11] 4,039,851

[45] Aug. 2, 1977

[54] TIME DISPERSION TUNED RAMAN OSCILLATOR

[75] Inventors: Ravinder Kumar Jain, Matawan; Chinlon Lin, Middletown; Rogers Hall Stolen, Rumson, all of N.J.

[73] Assignee: Bell Telephone Laboratories, Incorporated, Murray Hill, N.J.

[21] Appl. No.: 756,558

[22] Filed: Jan. 4, 1977

[51] Int. Cl.$^2$ .............................................. H03F 7/00
[52] U.S. Cl. .............................. 307/88.3; 331/107 R; 363/157
[58] Field of Search ................... 307/88.3; 331/107 R; 321/69 R

[56] References Cited

U.S. PATENT DOCUMENTS 3,705,992 12/1972 Ippen et al. ........................ 307/88.3

OTHER PUBLICATIONS

Colles, "Applied Physics Letters," 15, July 1971, pp. 23–25.

*Primary Examiner*—Palmer C. Demeo
*Assistant Examiner*—Darwin R. Hostetter
*Attorney, Agent, or Firm*—Daniel D. Dubosky

[57] ABSTRACT

There is disclosed a time-dispersion tuned Raman oscillator which makes use of the frequency-dependent transit time of Stokes radiation through a long optical fiber. Time-dispersion tuning is effected by synchronizing Stokes radiation of the desired frequency with a pump pulse. This synchronization may be accomplished either by adjusting the delay of the feedback pulse relative to a pump pulse or by adjusting the repetition rate of the pulsed pump laser.

7 Claims, 5 Drawing Figures

TIME DISPERSION TUNED RAMAN OSCILLATOR

BACKGROUND OF THE INVENTION

Previous tunable Raman oscillators have incorporated frequency dispersive elements such as prisms or gratings in order to separate different frequencies in space so that a desired frequency may be selected and incorporated in the feedback process required for oscillation. For example, U.S. Pat. No. 3,705,992 issued to E. P. Ippen et al on Dec. 12, 1972 discloses tuning by means of a prism (FIG. 3) which refracts different frequencies at different angles or by means of a lens with severe chromatic aberrations (FIG. 4) which focuses different frequencies at different positions along the optic axis. Both these devices are spatial dispersion tuning devices, since selection of a desired frequency is accomplished by separating frequencies in space, either in angle or position. This prior work involves the use of a short fiber (190 cm) and a laser pump pulse that is long relative to the transit time of the fiber, so that the oscillator light at the desired frequency can make many round trips in the oscillating cavity during the pump pulse.

SUMMARY OF THE INVENTION

Our invention is a time-dispersion tuned Raman oscillator, which accomplishes tuning of the oscillator output frequency by varying the relationship in time of a pump pulse and a feedback pulse taken from the output of the Raman gain medium of the oscillator. The separation of fequencies in time which is required in order for time adjustment to distinguish among frequencies is provided by the dispersive properties of an optical fiber Raman medium. Since the optical group velocity of transmission media varies with frequency, the speed of propagation through a medium will be different for different frequencies, and therefore the transit time through the medium will also vary with frequency. The time relationship between the feedback pulse and the pump pulse may be varied by changing the delay of the feedback pulse while holding the time between pump pulses fixed, by changing the time between pump pulses while holding the feedback pulse delay fixed, or by changing both.

DETAILED DESCRIPTION

Figure 1:
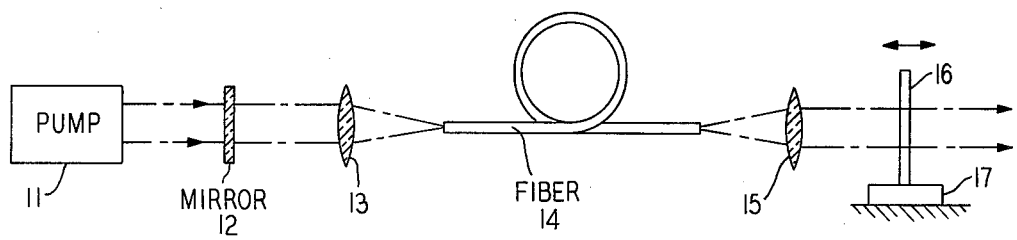
FIGS. 1, 2 and 4 show in partially pictorial, partially schematic form embodiments of the invention which change the delay of the feedback pulse.

In FIG. 1, a pump laser 11, illustratively a cw (continuous wave) Argon laser, mode-locked at 5145A so that it emits a continuous train of subnanosecond pulses spaced 12 nanoseconds apart, produces pump pulses which pass through mirror 12, which is the output mirror of the pump laser, in a parallel beam. The pump laser could be separate from mirror 12, if desired. This beam is focused by lens 13, illustratively a 20X anti-reflection coated microscope objective, into fiber 14. Fiber 14 is illustratively 100 meters long, with a pure silica core 3.3 μm in diameter, having a loss at 5145A of 17 dB/km. Output lens 15, illustratively a 20X anti-reflection coated achromatic microscope objective, forms the output into a parallel beam. Output mirror 16 reflects most of the output radiation back toward the fiber (illustratively the mirror reflects 98 percent of the radiation). Mirror 16 is mounted on support means 17 of conventional type which permit translation parallel to the direction of travel of the output radiation.

The oscillation cavity is formed by the two mirrors and the elements between them.

In operation a pump pulse from laser 11 passes through mirror 12 and meets a feedback Stokes pulse which is reflecting off mirror 12. The two pulses are focused by lens 13 into fiber 14, where the Raman scattering process transfers power from the pump pulse to the Stokes pulse and to other frequencies within the Raman gain bandwidth. Since the optical group velocity in silica is frequency dependent, the selected Stokes frequency will leave the fiber at a different time than the residue of the pump pulse and any other frequencies generated during that pass. The output radiation is reflected by mirror 16 back through the fiber to the input mirror. Because of the adjustment of position of the output mirror 16, only the pulse of the desired output frequency will be in synchronism with a pump pulse and will be reinforced in subsequent passes through the fiber. After many passes, the selected Stokes frequency will be greatly enhanced relative to all the other frequencies which are generated in a single pass of the pump pulse through the fiber.

The output radiation is that which passes through partially transmitting mirror 16. The desired output frequency may be separated from the pump or other frequencies present by a suitable dispersive element such as a grating or prism, or by a filter.

Figure 2:
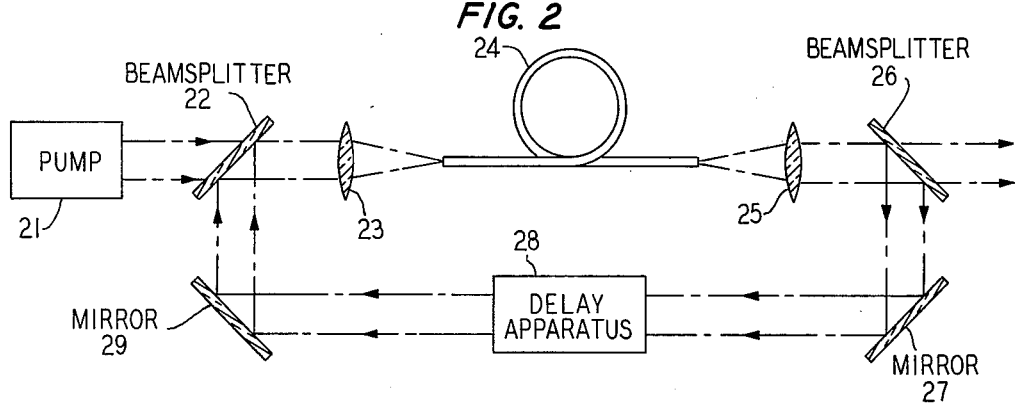

Another embodiment of the invention, shown in FIG. 2 uses a feedback return path outside the fiber, avoiding the extra attenuation caused by a return path inside the fiber. In this embodiment, laser 21 sends a pump pulse through beamsplitter 22, where the pump pulse meets a feedback Stokes pulse of the desired frequency which is being reflected by said beamsplitter onto the optic axis of the apparatus, after being delayed in time by the amount required to put it in synchronism with the pump pulse. The two pulses are focused by lens 23 into fiber 24, where the stimulated Raman process transfers power from the pump pulse to the Stokes pulse of the desired frequency. The radiation issuing from the fiber is collimated by lens 25. Most of the radiation is reflected by beamsplitter 26 into the return path of the feedback loop. Some of the radiation is transmitted by beamsplitter 26 and provides the output. The feedback radiation is reflected by mirror 27 into delay apparatus 28 of conventional type, which provides an adjustable delay time for the radiation passing through it. This delay time is adjusted so that the pulse of the desired output frequency is in synchronism with a pump pulse and is therefore enhanced in the next pass through the Raman medium. The radiation leaving delay apparatus 28 is reflected by mirror 29 toward beamsplitter 22, where it meets a pump pulse and begins the next pass through the apparatus.

Figure 3:
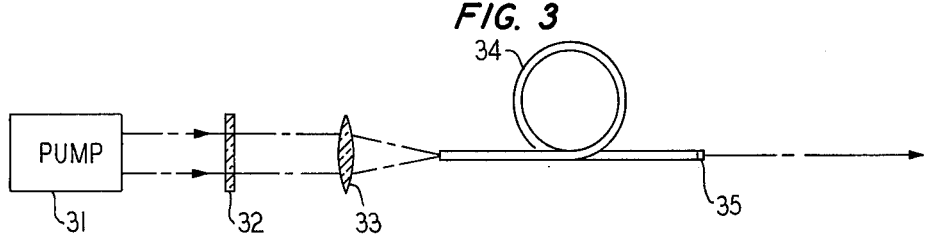
FIGS. 3 and 5 show in partially pictorial, partially schematic form embodiments of the invention that use variation of the pump pulse repetition rate to achieve tuning.

A third embodiment of the invention, illustrated in FIG. 3, differs from the preceding two embodiments in that the synchronization of a feedback pulse and a pump pulse is effected by adjustment of the repetition rate of the pump laser. Pump pulses from laser 31 pass through mirror 32, illustratively transmitting at the pump frequency and reflecting over the desired range of output frequencies, and are focused by lens 33 into fiber 34. The end of fiber 34 is polished and coated to form a partially reflecting, partially transmitting mirror 35, from which the output radiation emerges. Feedback radiation is reflected back through fiber 34 and lens 33 to mirror 32, where it is reflected at the same time that a pump pulse passes through. Both pulses are then focused by lens 33 into fiber 34 for the next pass. Tuning is effected by adjusting the repetition rate of the pump laser so that a subsequent pump pulse is in synchronism with feedback radiation of the desired frequency.

Figure 4:
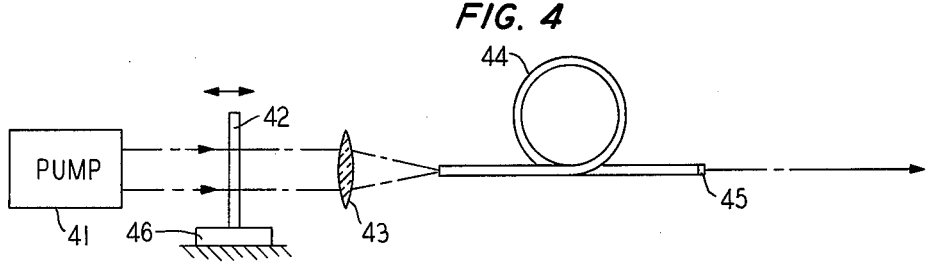

FIG. 4 shows a simplified version of the embodiment in FIG. 1. A pump laser 41 transmits radiation through mirror 42 and lens 43 into fiber 44. The end of fiber 44 is treated and coated to form a partially reflecting mirror 45, which permits some radiation to pass through to provide the output. Tuning is effected by translation of mirror 42 which is mounted on translation apparatus 46 of conventional type. Since the first mirror is movable, it is not used as part of the laser cavity.

Figure 5:
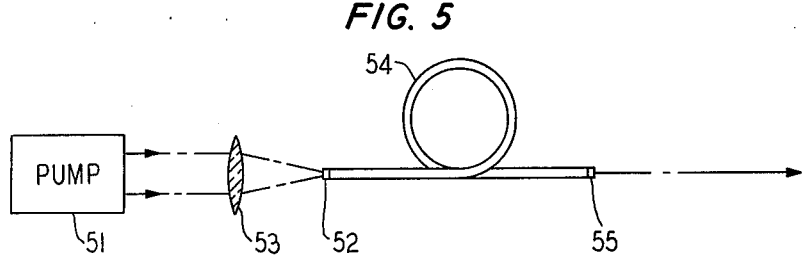

FIG. 5 shows a simpler version of the apparatus in FIG. 3, in which both ends of the fiber are treated and coated to form mirrors. Pump laser 51 transmits a series of pump pulses through lens 53 which focuses them through coating 52 into fiber 54. Coating 55 is partially transmitting over the turning range of the apparatus, permitting the output radiation to escape. Tuning of the output frequency is effected by adjustment of the repetition rate of laser 51, as is done in the embodiment illustrated in FIG. 3.

The embodiments shown in FIGS. 3, 4 and 5 have the advantage that the losses associated with the process of focusing radiation into the fiber are reduced by coating one or both ends of the fiber to form a mirror and therefore eliminating a lens.

We claim:

1. A Raman oscillator comprising
an optical fiber having a substantial Raman gain bandwidth and a frequency-dependent optical group velocity,
repetitively pulsed laser means for transmitting pump pulses of radiation through said fiber, and
means for selectively resonating in said fiber a pulse of Rama-scattered radiation of wavelength within a tuning range such that substantially the same path is taken through said resonating means by all Raman-scattered radiation within said turning range, which selective resonating process is controlled by adjustment of the time relationship between a feedback pulse of Raman-scattered radiation and a pump pulse.

2. A Raman oscillator comprising
means for producing repetitive pump pulses of radiation,
an optical fiber having a substantial Raman gain bandwidth and a frequency-dependent optical group velocity,
substantially achromatic means for focusing radiation into and out of said fiber, which focusing means direct said pump pulses through said fiber, and
means for selectively resonating a pulse of Raman-scattered radiation of predetermined wavelength within said fiber by adjusting the relationship in time of a feedback pulse of Raman-scattered radiation and a pump pulse.

3. A Raman oscillator according to claim 2 in which the means for selectively resonating a pulse of Raman-scattered radiation of predetermined wavelength comprises a pair of mirrors, at least one of which may be translated parallel to the direction of travel of the radiation, and in which said pulse of Raman-scattered radiation of predetermined wavelength traverses said optical fiber in two directions.

4. A Raman oscillator according to claim 3 in which one of said mirrors is formed by coating an end of said fiber with reflective material.

5. A Raman oscillator comprising means for producing repetitive pump pulses of optical radiation,
an optical transmission medium having a substantial Raman gain bandwidth and a frequency-dependent optical group velocity,
a first lens for focusing said pump pulses into said optical transmission medium, whereby a pulse of Raman-scattered Stokes radiation is generated in said medium,
a substantially achromatic second lens for collimating the radiation emerging from said medium,
means for reflecting a portion of said emerging radiation back through said second lens into said medium, whereby said reflected radiation is transmitted through said medium and collimated by said first lens,
a first mirror for reflecting the radiation collimated by said first lens back through said first lens into said transmission medium, and
means for varying the relationship in time of said reflected radiation and a pump pulse, such that different portions of said reflected radiation may be put in synchronism with said pump pulse at said first mirror.

6. A Raman oscillator comprising means for producing repetitive pump pulses of radiation,
an optical fiber having a substantial Raman gain bandwidth and a frequency-dependent optical group velocity,
means for transmitting a pump pulse through said fiber, whereby a pulse of Raman-scattered radiation is generated in said fiber,
means for feeding back over a path outside said fiber a portion of said pulse of Raman-scattered radiation for a subsequent pass through said fiber,
means for adjusting the time relationship of said pulse of Raman-scattered radiation and a subsequent pump pulse, whereby Raman-scattered radiation of a desired output frequency is enhanced in intensity by the Raman-scattering process during a subsequent pass through said fiber.

7. A Raman oscillator comprising pulsed laser means for producing repetitive pump pulses of radiation, having a variable repetition rate,
an optical fiber having a substantial Raman gain bandwidth and a frequency-dependent optical group velocity,
means for transmitting said repetitive pump pulses through said fiber, whereby pulses of Raman-scattered radiation are generated in said fiber,
means for feeding back portions of said pulses of Raman-scattered radiation through said fiber in synchronism with subsequent pump pulses, which synchronism is effected by adjustment of the repetition rate of said pulsed laser means, whereby a desired output frequency enhanced in intensity by the Raman-scattering process during multiple passes through the fiber in synchronism with a pump pulse.

* * * * *